United States Patent
Kunde et al.

(10) Patent No.: US 8,549,653 B2
(45) Date of Patent: Oct. 1, 2013

(54) SECURE WILDCARD SEARCHABLE DATABASE

(75) Inventors: Raghu Ram Kunde, Keyport, NJ (US); Ernesto Andrade, Jr., Freehold, NJ (US)

(73) Assignee: Morgan Stanley, New York, NY (US)

( * ) Notice: Subject to any disclaimer, the term of this patent is extended or adjusted under 35 U.S.C. 154(b) by 77 days.

(21) Appl. No.: 13/232,055

(22) Filed: Sep. 14, 2011

(65) Prior Publication Data
US 2013/0067226 A1    Mar. 14, 2013

(51) Int. Cl.
*H04L 29/06* (2006.01)

(52) U.S. Cl.
USPC ............... 726/26; 726/27; 713/168

(58) Field of Classification Search
USPC ............... 713/168, 193; 726/26, 27
See application file for complete search history.

(56) References Cited

U.S. PATENT DOCUMENTS

| | | | |
|---|---|---|---|
| 2004/0158527 A1* | 8/2004 | Lambert | 705/51 |
| 2009/0077378 A1* | 3/2009 | Hacigumus et al. | 713/165 |
| 2010/0211800 A1* | 8/2010 | La Rocca et al. | 713/189 |
| 2011/0004607 A1* | 1/2011 | Lokam et al. | 707/759 |

* cited by examiner

*Primary Examiner* — Edward Zee
*Assistant Examiner* — Chi Nguy
(74) *Attorney, Agent, or Firm* — Weitzman Law Offices, LLC

(57) ABSTRACT

A system and method for providing access to data stored in encrypted form in a physically non-secure database without compromising security of the data in the physically non-secure database is disclosed. A representation of at least some of the data from the database in unencrypted form is stored in volatile memory associated with the server. The wildcard search is performed on the representation. Search results are displayed to the user to allow the user to select database contents to be retrieved. The user's selection is retrieved from the database and decrypted. Finally, the unencrypted selection results are provided to the user.

16 Claims, 7 Drawing Sheets

SECURE WILDCARD SEARCHABLE DATABASE

BACKGROUND

1. Field

This disclosure relates generally to database security, and, more particularly, to secure wildcard searching of a database.

2. Background

It in not uncommon for companies to have numerous databases and to use in-house Information Technology (IT) staff or even third parties to maintain the databases. Moreover, those databases may be located in places where the owner cannot control physical access to the devices or storage making up the database or to communication lines to and from such databases (hereafter referred to as "remote" storage).

In some cases, these databases may contain sensitive or confidential information which the owner wishes to ensure cannot be accessed by unauthorized persons, including the owner's IT staff, for example, database administrators. One way of doing so is by encrypting the database contents and maintaining the decryption key separate from access by those who could access the database but are not authorized to have access to its sensitive contents, while keeping the decryption key accessible to the relevant secure computers of those with legitimate need to access. By doing so, only persons who have such access to the decryption key can meaningfully and securely access the contents by retrieving the desired encrypted data to a secure computer and then decrypting it. However, this can present a security problem when such authorized users wish to search the database contents.

In general, there are only two ways to search a remote encrypted database. One may either decrypt the contents and perform the search on the unencrypted contents, which compromises the security of the remote database because it becomes possible for unauthorized persons to gain access to the unencrypted contents, or only allow "exact string" searches. An exact string search is less likely to compromise security because the string to be searched can be encrypted in the same manner as the database contents and the resulting encrypted string can be matched with the similarly encrypted database contents. Thus, if the term "dollars" encrypts to the string "x%Wz3&7", which would be meaningless to any observers who have access to the remote storage, the database can be searched for the exact encrypted string x%Wz3&7 and return to the user encrypted results containing that string for decryption on the user computer, thereby maintaining the security of the database contents in the remote storage.

The same is not generally true however for wildcard searches in which not only the exact search term is sought, but any other terms that contain variants of the term delimited by the wildcard character(s). With a wildcard search, for example, an asterisk can be used as a character that denotes any one or more characters that follow the specific string preceding it. By way of example, a search for "distr*" in a database can be used to obtain all records containing "distr" followed by any number of characters. Thus, in this example, a search for "distr*" might return all records containing any of the following terms: "distress," "distressed," "distribute," "distribution," "distraction," and "district."

This wildcard search problem is compounded if wildcards can be within a string (for example, "wom*n" to search for woman and women), pre-pend a string (for example, "*posit" to search for deposit and composite), or multiple wildcards can be part of a single string (for example, "*port*y" to search for "reportedly," "proportionally" and "exportability)", because the encrypted form of the target words could be encrypted very differently and thus the search term would not be easily matched to the contents of the encrypted database.

As a result, there is a need for a way to allow for wildcard searching of encrypted remote database content that does not concurrently compromise security of the content.

BRIEF SUMMARY

In one aspect of this disclosure, a system and method is disclosed for providing access to data stored in encrypted form in a physically non-secure database without compromising security of the data in the physically non-secure database. A representation of at least some of the data from the database is maintained in volatile memory in unencrypted form and associated with a server. A request is received to search the data from an authorized user, the request containing a wildcard character. The request containing the wildcard character is executed by conducting a wildcard search on the representation in volatile memory of the server. Search results sufficient to allow the user to select database contents to be retrieved are displayed to the user. A selection is received from the user. Specific encrypted data associated with the user's selection is retrieved from the database. The specific encrypted data is decrypted using a key that is accessible by the server but is remote from, and inaccessible to, the physically non-secure database to obtain unencrypted selection results. The unencrypted selection results are provided to the user.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
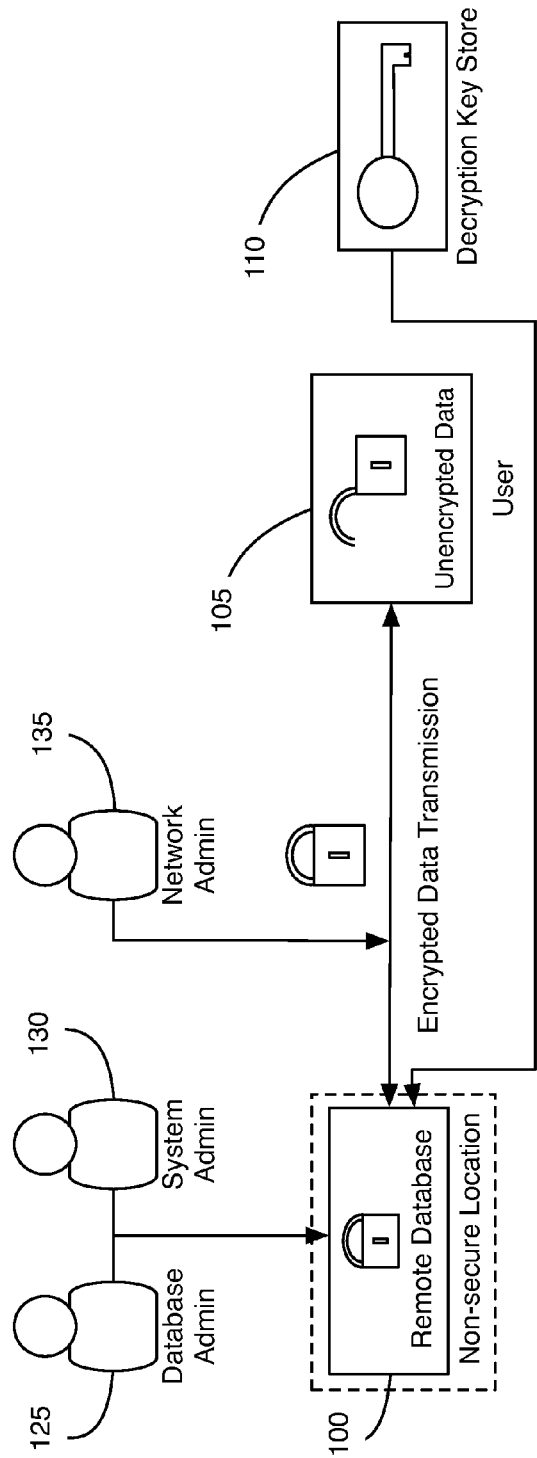
FIG. 1 is a high-level representation of a traditional database solution, illustrating the problems presented when attempting to implement a remote wildcard-searchable database.

FIG. 1 is a high-level representation of a traditional database solution, illustrating the problems presented when attempting to implement a wildcard-search capability on a remote, encrypted database. Remote database 100 is housed in storage at a remote location, in the sense that preventing access by persons who should not have access to the database contents at all is outside of the control of the owner of the remote database 100. As a result, it may be subject to access from unauthorized personnel at the non-secure location. For example, database administrators 125 may possess direct access to remote database 100 contents because of their assigned role. If not, they may nevertheless be able to attach foreign processes to the database for legitimate reasons, but those processes could also be used to gain unauthorized access to the information. For example, system administrators 130 may be able to attach foreign processes to existing application processes to legitimately examine application data as it operates within system memory or is transferred over data busses, and thereby may view the data as it is being transmitted to and from the remote database 100. To prevent this, the contents of database 100, and all transmissions to and from the remote database 100, can be encrypted to deter illicit access by these parties. Additionally, decryption keys for decrypting encrypted information on the remote database 100 must be kept unavailable to such persons in a secure decryption key store 110 so that even if database administrators 125, system administrators 130 or network administrators 135 manage to access the contents of remote database 100 in encrypted form, they will be unable to use it because they lack the ability to decrypt it. This security scheme adequately protects remote database 100 contents, as a general matter. However, as described above, it is extremely difficult to implement a wildcard search process on a database 100 in remote storage that is encrypted due to the encryption of the body of searchable data. A solution is needed that simultaneously retains the security of the remote database 100, while also enabling wildcard searching of the contents of the remote database 100.

Figure 2:
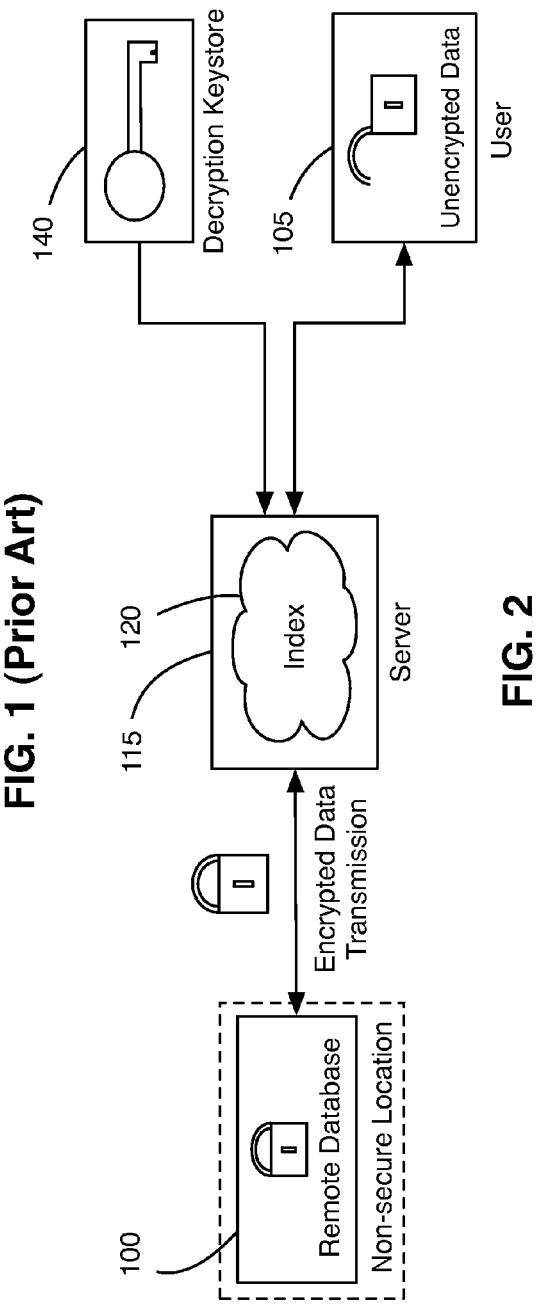
FIG. 2 is a high-level representation of the remote wildcard-searchable database disclosed herein, illustrating the differences from the traditional solutions of FIG. 1.

FIG. 2 is a high-level representation of a secured wildcard-searchable remote database as disclosed herein, as compared with the system of FIG. 1. A representational index 120, maintained in unencrypted form, is created and maintained purely in volatile memory of a server 115 in a secure location. When the server 115 is initialized, the representational index 120 is generated and populated with a subset of content information received from the encrypted database 100 for those fields that are to be wildcard searchable.

Specifically, when initialized, the server will request the encrypted content that can be subject to wildcard search from the remote database 100, by record #, field #, or other manner that does not disclose contents thereof. That information will then be transmitted in encrypted form, by the remote database 110 to the server 115. Advantageously, since the information transferred is encrypted, the communication channel need not be secure. When the information is received by the sever 115, the server requests the decryption key from a separate, and secure, key store. Upon receipt, the key is used to decrypt the received information into unencrypted form. Next, the server 115 builds the representational index 120 in memory in a way that allows it to be wildcard searched and to identify the record and/or field in the remote database 100 where the corresponding information is stored in encrypted form.

Wildcard searches may then be performed upon the unencrypted contents of the representational index 120 via the server 115, and the results of the search conducted on the representational index 120 will be used to retrieve the corresponding records on the remote database 100 that contain the desired information. Based upon the record identification, the corresponding content on the encrypted database 100 can thus be requested without compromising security because it can be retrieved in encrypted form. Subsequently, the server 115 retrieves the appropriate decryption key from the secure decryption keystore 140, decrypts the information and presents it to the user. Alternatively, when the user 105 is utilizing a secure system, the encrypted content may be forwarded directly to the user 105 computer which may then access the decryption keystore 110 directly and decrypt the encrypted content for viewing.

Thus, it should be evident that the disclosed system enables wildcard searching to be performed on the remote database 100, while simultaneously preserving the security for the remote database 100. At all times the contents of the remote database 100 remain encrypted at the remote location and the decryption key store 140 is located in a separate location inaccessible to unauthorized persons at the remote locator.

Figure 3:
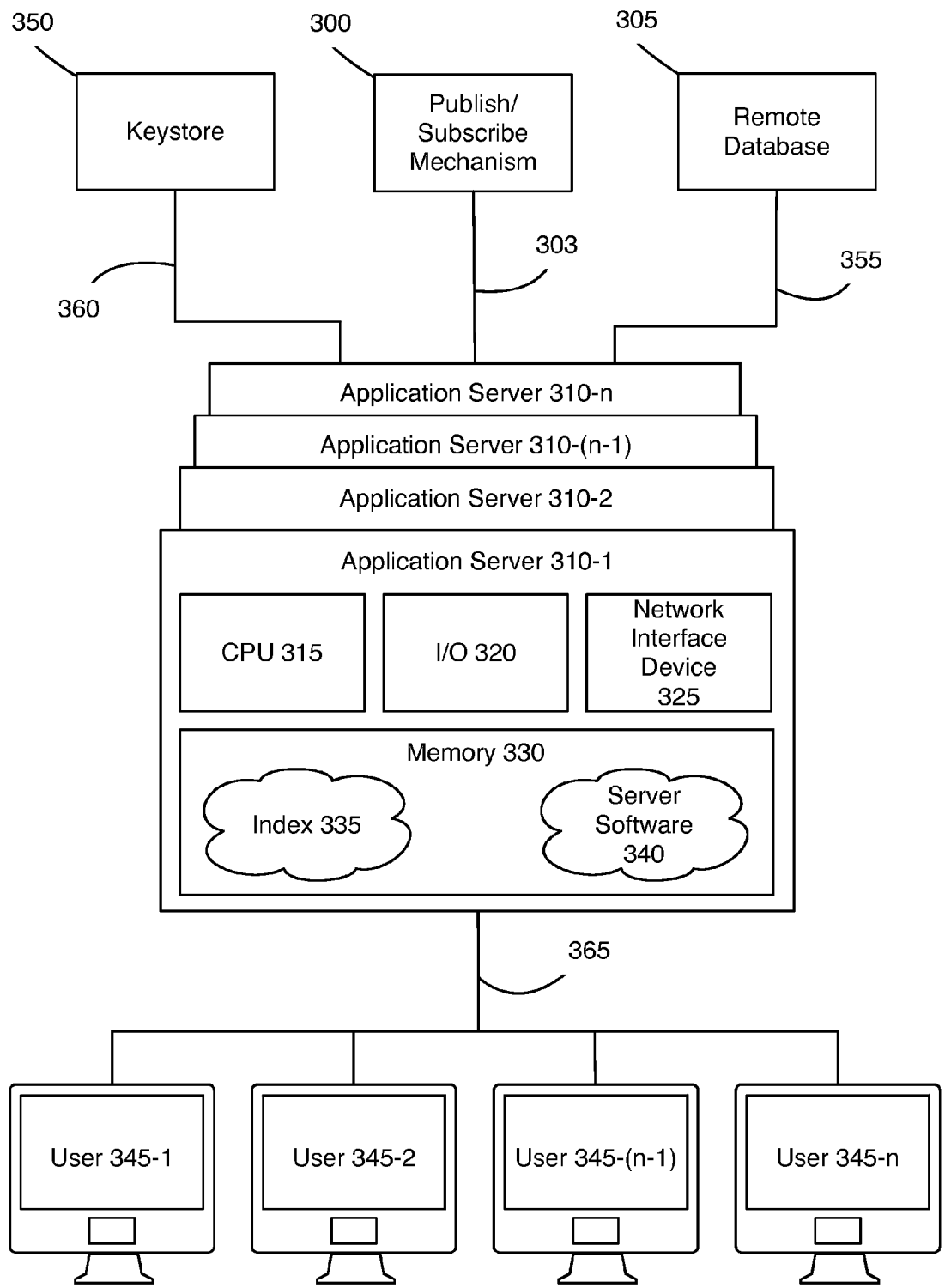
FIG. 3 is a high-level representation of an example remote database having wildcard search capability via the inclusion of application servers.

FIG. 3 is a high-level representation of an example remote database 305 having wildcard search capability via the inclusion of application servers 310-1, 310-2, 310-(n−1) and 310-n that each function like the server 115 of FIG. 2. The remote database 305 may be implemented using conventional solutions, such as Oracle™, Microsoft Access™, SQL™, or IBM DB2™. Any encryption schemes for securing the data, such as the Data Encryption Standard, LK189, Advanced Encryption Standard, or some other symmetric or asymmetric encryption scheme, may be utilized as well, the specifics of which are beyond the scope of this disclosure.

The application servers 310-1, 310-2, 310-(n−1) and 310-n act as intermediaries between the remote database 305 and the remote users 345-1, 345-2, 345-(n−1) and 345-n. Any number of application servers may be provided for the remote database 305, as more application servers may be beneficial for a larger population of, or geographically distributed, users. It is understood that the number of users 345-1, 345-2, 345-(n−1) and 345-n and number application servers 310-1, 310-2, 310-(n−1) and 310-n depicted herein are not representative or limiting, and is presented as such only for the purposes of clarity. Any number of application servers may be utilized to accommodate any number of search users.

Each application server 310-1, 310-2, 310-(n−1) and 310-n includes a central processing unit ("CPU") 315, volatile memory 330, input/output (I/O) devices 320, and a network interface device 325. The CPU 315 processes and executes computer program instructions. Volatile and/or fast access cache memory 330 preferably provides fast data supply to CPU. More permanent forms of computer memory may be provided as well, such as (for example) a hard disk, optical disk, flash memory, solid-state memory, tape, or any other type of memory. The I/O device(s) 320 permit human interaction with the computer system, such as (but not limited to) a mouse, keyboard and computer display. I/O device(s) 320 may also include other interactive devices, such as (but not limited to) touch screens, digital stylus, voice input/output, etc., input/output (I/O) devices, and a network interface. Finally, the network interface device 325 allows the application servers 310-1, 310-2, 310-(n−1) and 310-n to communicate with other systems located remotely on one or more networks 355, 360, 365, which may be a computer network such as a corporate intranet, or the Internet.

Each application server 310-1, 310-2, 310-(n−1) and 310-n operates server software 340 in memory 330. Server software 340 implements the functionality necessary to send and receive database requests, commands, edits, etc. from users 345-1, 345-2, 345-(n−1) and 345-n to the remote database 305 (and vice versa) thereby enabling communication between the users 345-1, 345-2, 345-(n−1) and 345-n and the remote database 305. Each application server 310-1, 310-2, 310-(n−1) and 310-n also stores an iteration of the representational index 335 in volatile memory 330. As described above, the representational index 335 is an unencrypted index of that portion of the database content subject to wildcard searching, and is provided for the purpose of enabling wildcard searching on the remote database 305. The representational index 335 is created procedurally in each application server when the application servers 310-1, 310-2, 310-(n−1) and 310-n are powered on or after a memory reset, and is destroyed when the application servers 310-1, 310-2, 310-(n−1) and 310-n are powered off or memory is reset or flushed. The representational index 335 may be implemented using any conventional in-memory solution that can be searched and can allow for cross-referencing of results to records in the remote database 305. For example, the representational index 335 may be implemented using "h2database," an open-source Java™-based SQL™ in-memory database solution or using an in-memory spreadsheet or tabular file arrangement.

Where only one representational index exists, any change to the wildcard searchable content of the database must be reflected in the representational index 335. However, where multiple instances of the representational index 335 are involved due to use of multiple servers, all the representational indices 335 must be kept consistent, in the event one detects or is involved in a change to contents of the remote database 305, some mechanism is required to ensure that the representational index 335 in each application server 310-1, 310-2, 310-(n−1), 310-n is updated to reflect that change.

There are different ways to maintain the consistency among the indices. One example of such a way is through use of a publish/subscribe mechanism 300 ensures consistency of the data in each individual representational index 335 on the disparate application servers 310-1, 310-2, 310-(n−1) and 310-n. Specifically, if a user 345-1, 345-2, 345-(n−1) or 345-n makes a change to the contents of the remote database 305 article, and the change includes information subject to later wildcard searching, the searchable information must be added to the representational index 335 in the memory 330 of each of the application search servers 310-1, 310-2, 310-(n−1) or 310-n to ensure all instances of the representational index 335 are up to date and consistent with one another. Because publish/subscribe mechanisms are well known in the art, some examples will be described here only briefly for clarity. The publish/subscribe mechanism 300 publishes a notification that a relevant change has been made. Subscribing systems (such as the application servers 310-1, 310-2, 310-(n−1) or 310-n, in this case) are subscribed to the publish/subscribe mechanism 300, and listen for published messages. When a published notification is detected, they retrieve the necessary update information and implement the change.

Figure 4:
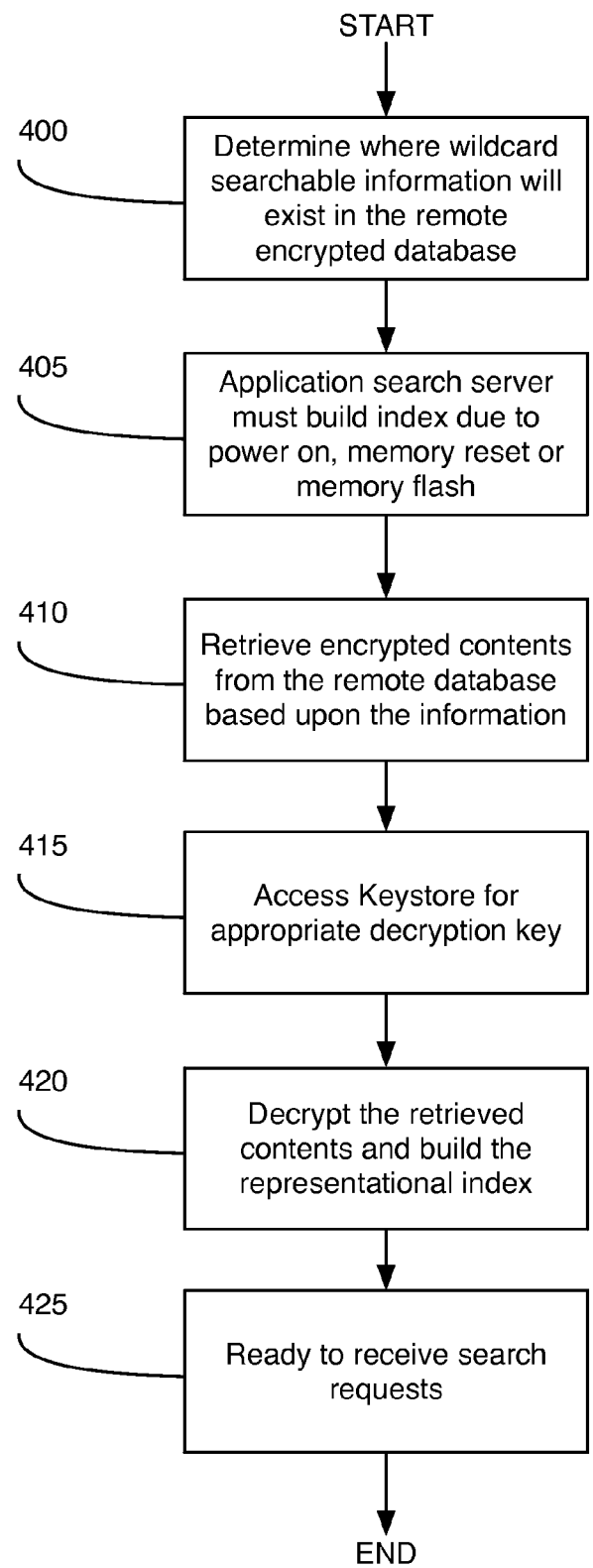
FIG. 4 is a flow chart depicting a process flow for initializing the representational index of the example remote wildcard-searchable database of FIG. 3.

FIG. 4 is a flow chart depicting a process flow for initializing the representational index 335 of the example remote wildcard-searchable database 305 of FIG. 3 in the volatile memory 330 of application servers 310-1, 310-2, 310-(n−1) and 310-n. Creation of the representational index 335 begins with pre-selection of data fields of the remote database 305 which would contain content subject to wildcard searching and thus needed to populate the representational index 335 (step 400). This may be done by, for example, an administrator, and needs to be done only once for all the application servers 310-1, 310-2, 310-(n−1) and 310-n. Once pre-selection is complete, identity data of the selected fields from which encrypted data must be retrieved to build the index 335 is stored.

When the application server 310-1, 310-2, 310-(n−1) or 310-n is powered on or the memory containing the index 335 is refreshed or flushed (step 405), the application server 310-1, 310-2, 310-(n−1) or 310-n accesses the stored identity data indicating which fields of information on the remote database 305 should be retrieved to populate the representational index 335. The application server 310-1, 310-2, 310-(n−1) or 310-n then queries the remote database 305 to retrieve that information (step 410). The application server 310-1, 310-2, 310-(n−1) or 310-n also accesses the keystore 350 to obtain the appropriate decryption key to decrypt the retrieved pre-selected information (step 415). Once the information is decrypted, it generates the representational index 335 in volatile memory 330 (step 420). The application server 310-1, 310-2, 310-(n−1) or 310-n is then ready to receive wildcard search requests from users 345-1, 345-2, 345-(n−1) and 345-n (step 425).

Figure 5:
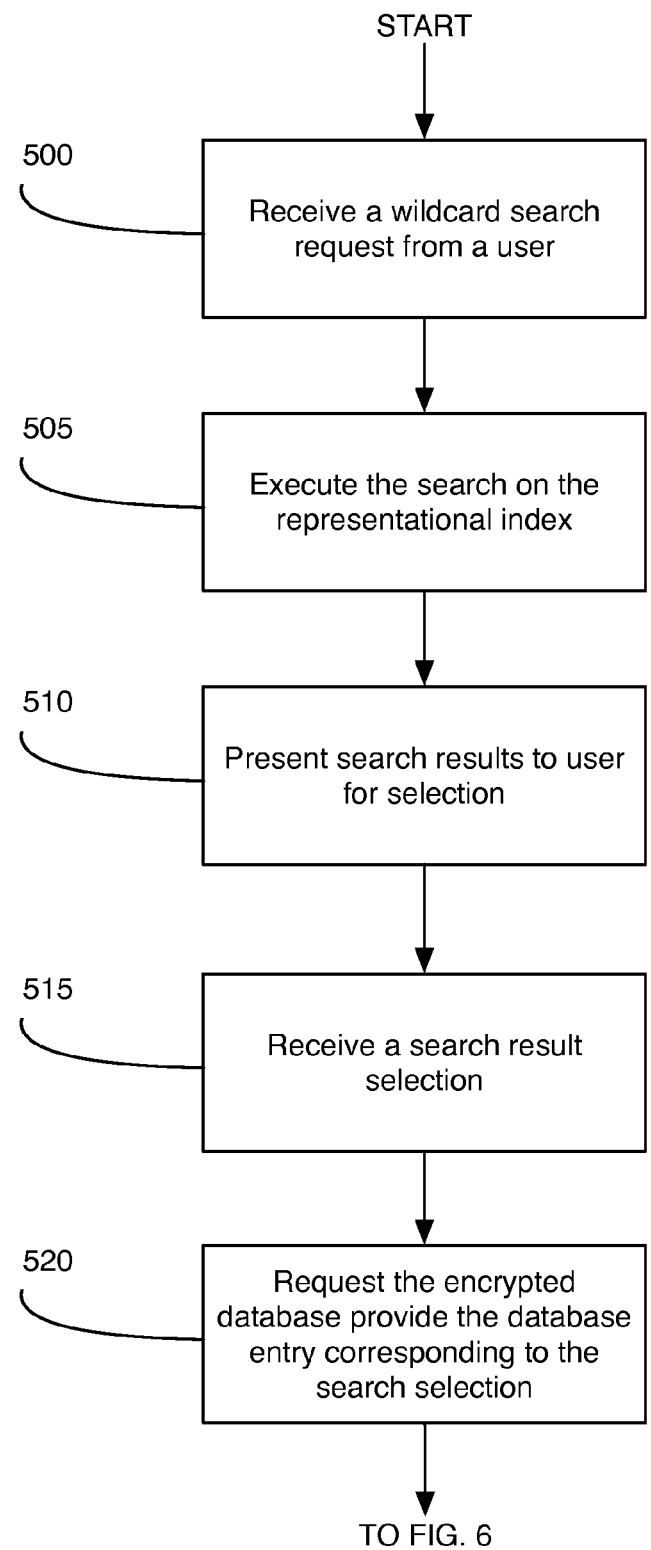
FIG. 5 is a flow chart depicting a process flow for executing a wildcard search on the example remote wildcard-searchable database of FIG. 3.

FIG. 5 is a flow chart depicting a process flow for executing a wildcard search on the example remote wildcard-searchable database 305 of FIG. 3. When a wildcard search request is received from any user 345-1, 345-2, 345-(n−1) or 345-n (step 500), the application server 310-1, 310-2, 310-(n−1) or 310-n executes the search on the representational index 335 (step 505). Search hits may then be presented to the user 345-1, 345-2, 345-(n−1) or 345-n for selection (step 510). Once the user 345-1, 345-2, 345-(n−1) or 345-n selects a desired search result (step 515), the application server 310-1, 310-2, 310-(n−1) or 310-n uses the associated record or field identifying information to request the full database record from the remote database 305 corresponding to the selected search hit (step 520). The database will respond with the requested encrypted content. The process then proceeds to the steps of FIG. 6.

Figure 6:
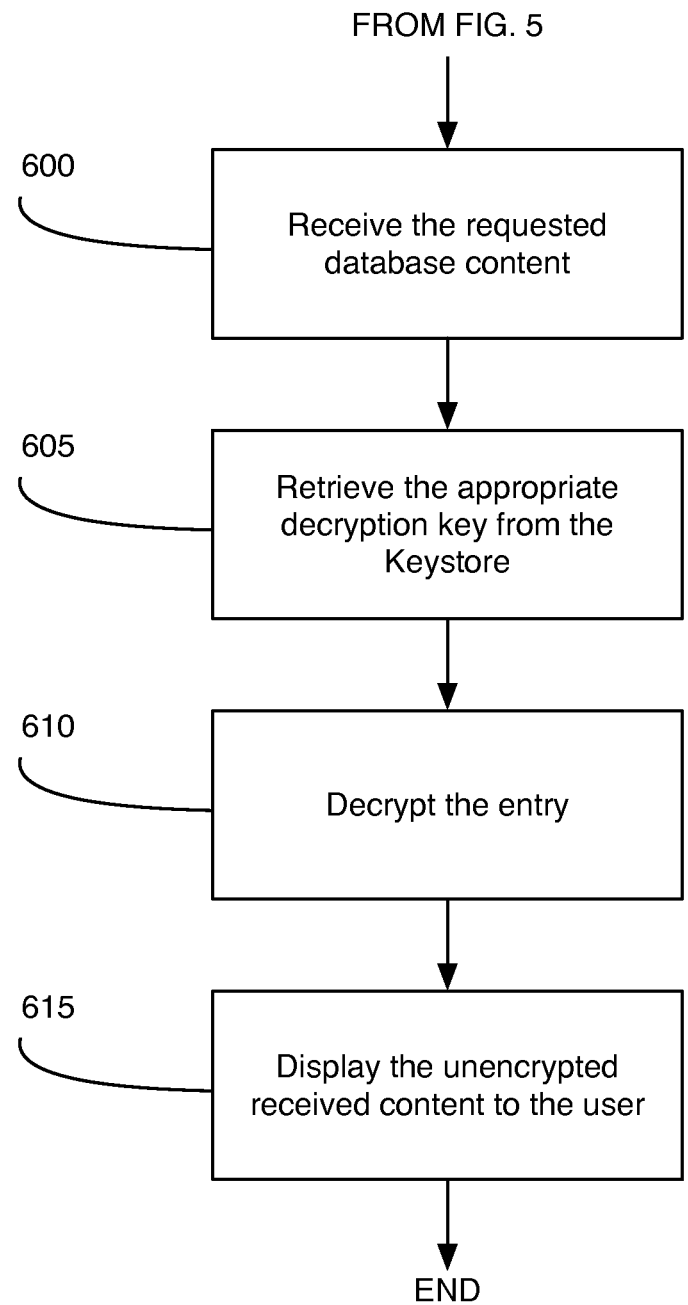
FIG. 6 is a flow chart depicting a continuing process flow for executing a wildcard search on the example remote wildcard-searchable database of FIG. 3.

FIG. 6 is a flow chart depicting a continuing process flow for executing the wildcard search on the example remote wildcard-searchable database 305 of FIG. 3. The application server 310-1, 310-2, 310-(n−1) or 310-n receives the requested database content (step 600), and also retrieves the appropriate decryption key from the keystore 350 (step 605). Note here that the key retrieval can occur before, during or after the content is requested or received. The record database content is decrypted (step 610) and then displayed in unencrypted format to the user that initiated the search (step 615).

Figure 7:
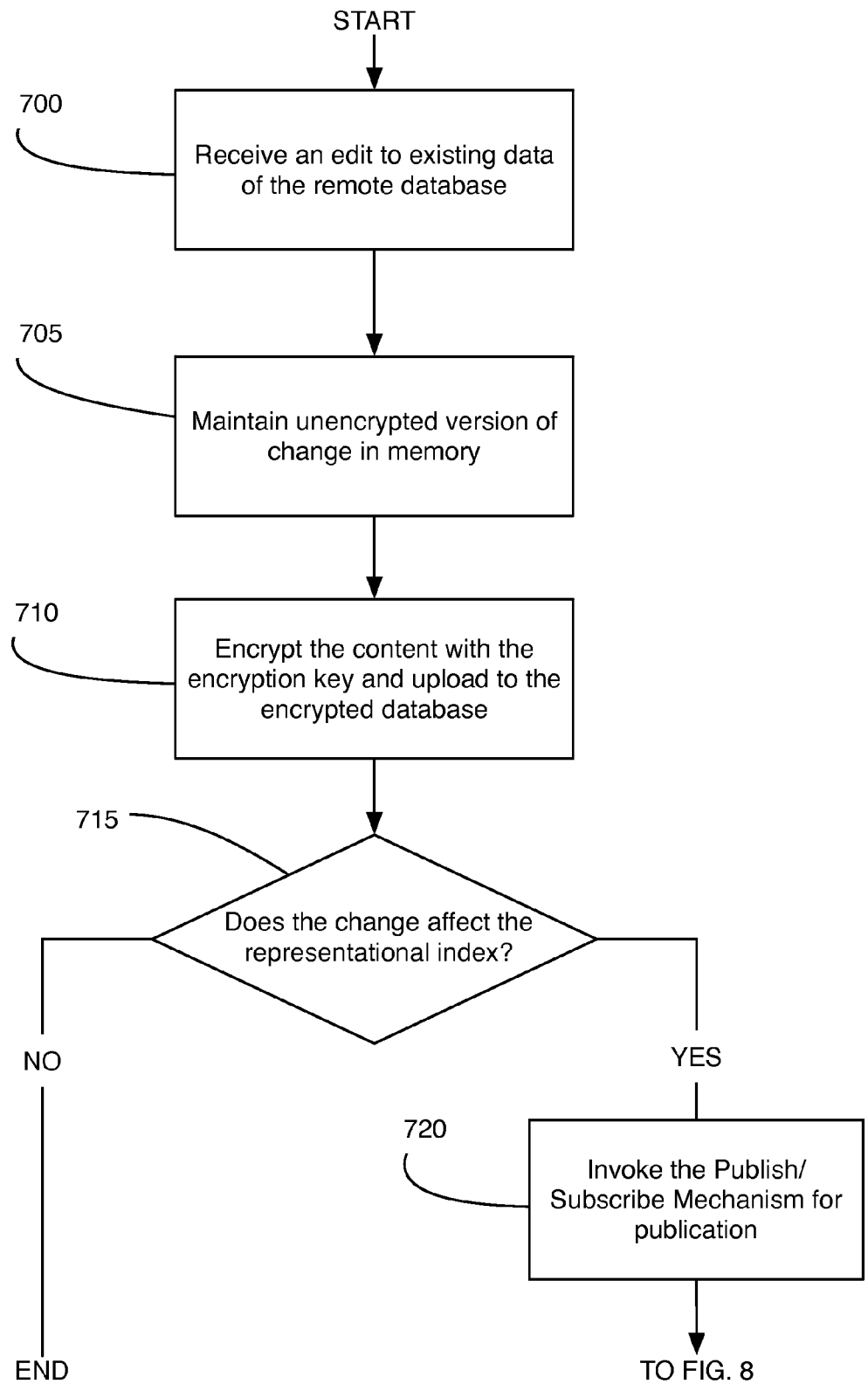
FIG. 7 is a flow chart depicting a process flow for updating the representational index when a change has been made to an entry stored on the example remote wildcard-searchable database of FIG. 3.

FIG. 7 is a flow chart depicting a process flow for updating the representational index 335 when a change has been made to an entry stored on the example database 305 of FIG. 3. When a user 345-1, 345-2, 345-(n−1) or 345-n makes a change to an entry in the remote database 305 that could be wildcard searched (step 700), the entry is encrypted using an encryption key, and uploaded to the remote database 305 (step 705). An unencrypted version of the change is also maintained in memory (step 710) for use in updating the representational index 335. The remote database 305, publish/subscribe updater 300 or application server 310-1, 310-2, 310-(n−1) and 310-n then determines whether the change affects the contents of the representational index 335 (step 715). A change affects the representational index 335 if the change is to any field or record that is subject to wildcard searching. If it does not, the process ends. If it does, then the publish/subscribe mechanism 300 is invoked for publication of a notification of the change (step 720). The process then proceeds to the steps of FIG. 8.

Figure 8:
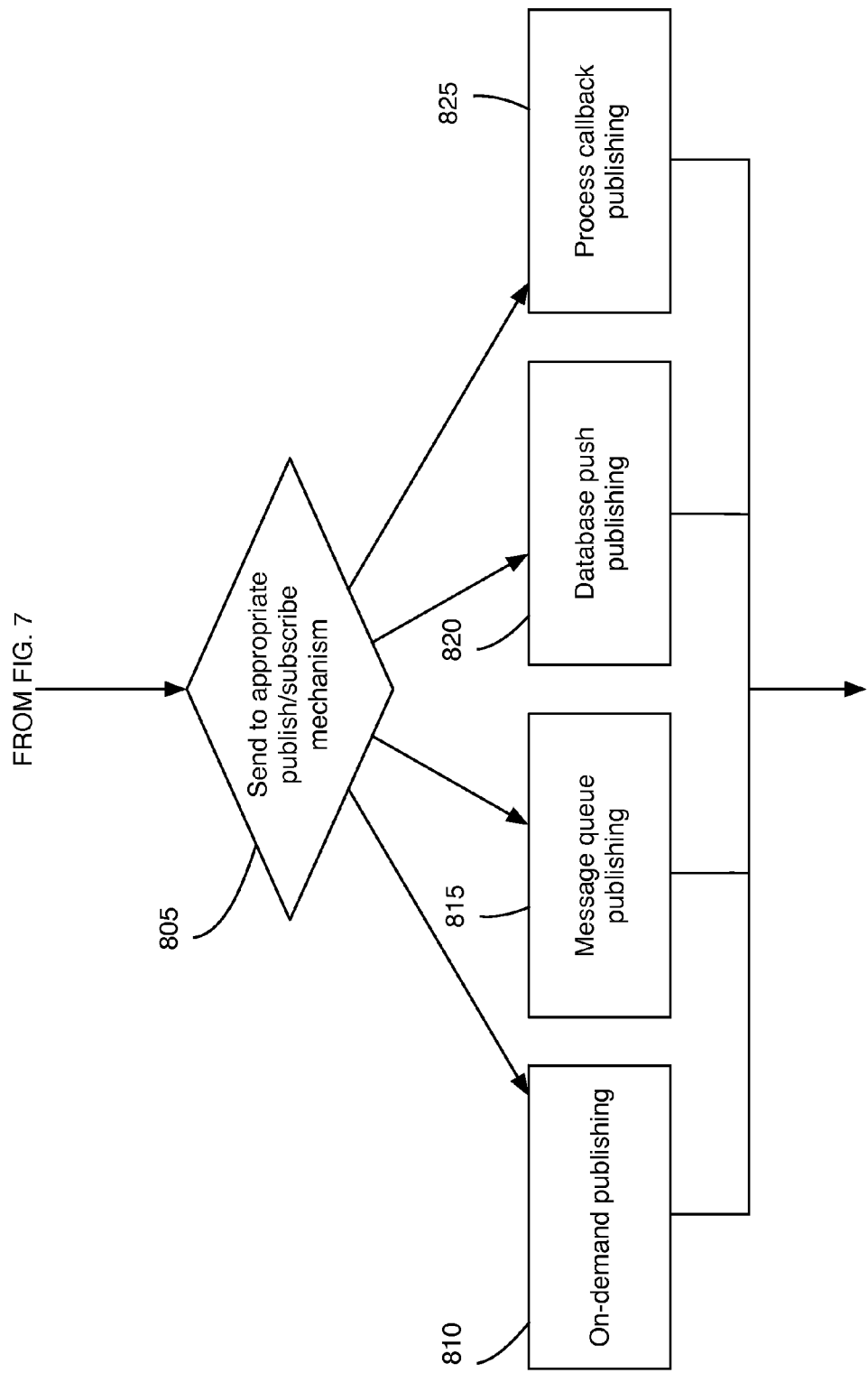
FIG. 8 is a flow chart depicting a continuing process flow for updating the representational index when a change has been made to an entry stored on the example remote wildcard-searchable database of FIG. 3.

FIG. 8 is a flow chart depicting a continuing process flow for updating the representational index 335 when a change has been made to content of the remote database 305.

Depending upon the particular implementation using multiple application servers, different updating variants can be used. If the remote wildcard-searchable database 305 is implemented without any variation among the application servers 310-1, 310-2, 310-(n−1) or 310-n, then, only one type of publish/subscribe mechanism may be necessary. However, if the application servers are heterogeneous and/or handle updates differently, the more than one publish/subscribe mechanism may be needed for the different servers in order to get them the information they need to update their respective representational indices.

After the publish/subscribe mechanism 300 is invoked, a publish/subscribe mechanism may be selected for use (step 805). Advantageously, with our approach, multiple publish/subscribe mechanisms may be used to service a more heterogeneous group of application servers 310-1, 310-2, 310-(n−1) or 310-n. For example, four types of publish/subscribe mechanisms to deal with four different types of update requests are presented for the purposes of explanation. The publish/subscribe mechanisms are on-demand publishing 810, message queue publishing 815, database push publishing 820 and process callback publishing 825.

On-demand publishing 810 is a passive publishing process. The notification of change is stored and the mechanism then waits passively for requests from the application servers 310-1, 310-2, 310-(n−1) and 310-n. The application servers 310-1, 310-2, 310-(n−1) and 310-n periodically send update requests to the publish/subscribe mechanism 300. In response, the change is forwarded to the application servers 310-1, 310-2, 310-(n−1) and 310-n.

A message queue publishing 815 utilizes a message queue to effect updating of external systems. Once the publish/subscribe mechanism 300 receives the change, it places the change on a message queue addressed to the other application servers. Application servers 310-1, 310-2, 310-(n−1) and 310-n read messages addressed to them off the queue and retrieve the change from the message. After applying the change, the application servers 310-1, 310-2, 310-(n−1) and 310-n place a message on the queue indicating to the publish/subscribe mechanism 300 whether the update operation completed successfully or failed. If it failed, other actions outside the scope of this application can be taken to remedy the failure.

Database push publishing 820 is generally utilized in situations where the application servers 310-1, 310-2, 310-(n−1) and 310-n are also database servers. Once the publish/subscribe mechanism 300 receives the change, it communicates directly with each application servers 310-1, 310-2, 310-(n−1) and 310-n and invokes the appropriate database commands to effect the update on the application servers 310-1, 310-2, 310-(n−1) and 310-n with the change. The publish/subscribe mechanism 300 then records whether the update operation succeeded or failed. Again, handling of the failure is outside the scope of this application.

Process callback publishing 825 relies on update processes already extant on the application servers 310-1, 310-2, 310-(n−1) and 310-n. Once the publish/subscribe mechanism 300 receives the change, it invokes an update process local to the application servers 310-1, 310-2, 310-(n−1) or 310-n and feeds the change to the process. The process then effects the update on the application servers 310-1, 310-2, 310-(n−1) and 310-n and reports success or failure back to the publish/subscribe updater 300. Again, handling of failures is outside the scope of this application.

As should now be appreciated, there could be instances where an application server must generate its representational index 335 even though the contents of the remote database 305 have not changed and all of the representational indices 335 in other application servers 310 are current. Advantageously, depending upon the particular implementation, the system could be configured for a direct transfer of the representational index 335 from one server to another server. However, such an approach may be unsuitable due to speed or other pressing requirements. In general, such a system would be best suited for homogenous, replicated servers.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method for providing access to data stored in encrypted form in a physically non-secure database without compromising security of the data in the physically non-secure database, the non-secure database residing in non-volatile storage, the method comprising:
  in a server,
    maintaining a representation of at least some of the data from the database in unencrypted form in volatile memory associated with the server;
    receiving a request to search the data from an authorized user, the request containing a wildcard character;
    executing the request containing the wildcard character by conducting a wildcard search on the representation in the volatile memory of the server;
    displaying search results to the user sufficient to allow the user to select database contents to be retrieved from the non-volatile storage;
    receiving a selection from the user; retrieving from the database, specific encrypted data associated with the user's selection;
    decrypting the specific encrypted data using a key retrieved from a keystore that is accessible by the server but is stored remote from the server, and is inaccessible to both the physically non-secure database and the user, so as to obtain unencrypted selection results, wherein the server is one of multiple servers, wherein an other of the multiple servers contains a separate representation of the at least some of the data in volatile memory of the other server in unencrypted form;
    providing the unencrypted selection results to the user; and
    using a publish/subscribe messaging mechanism to maintain consistency between the unencrypted representation in the volatile memory of the server and the unencrypted separate representation in the volatile memory of the other server.

2. The method of claim 1,
  wherein, when contents of the data stored in encrypted form in the physically non-secure database is changed and the change affects information that must be included in the representation,
  the method further comprises:
    in the server,
      retrieving the affected information in encrypted form from the database;
      decrypting the affected information; and
      updating the representation to reflect the affected information.

3. The method of claim 1, wherein, when contents of the data stored in encrypted form in the physically non-secure database is changed and the change affect information that must be included in the representation, the method further comprises:
  in the server,
    retrieving the affected information in encrypted form from the database;
    decrypting the affected information; and
    updating the representation to reflect the affected information.

4. The method of claim 1, wherein the receiving the request comprises:
  receiving the request over an encrypted connection.

5. The method of claim 1, wherein the retrieving from the database comprises:
  retrieving the specific encrypted data over an unencrypted connection.

6. The method of claim 1, wherein the providing comprises:
  providing the unencrypted selection results to the user over an unencrypted connection.

7. The method of claim 1, wherein the maintaining the representation of the at least some of the data in volatile memory associated with the server comprises:
  maintaining the representation in unencrypted form in cache memory.

8. The method of claim 1, further comprising:
  retrieving encrypted database content from the physically non-secure database;
  decrypting the retrieved encrypted content; and
  storing the decrypted content as the representation in the volatile memory associated with the server.

9. A computer apparatus comprising:
  a server including a processor and volatile memory associated with, and accessible by, the processor, the server being configured for connection to a remote, physically non-secure database containing, in non-volatile storage therein, content stored in encrypted form, the volatile memory associated with the server having stored therein an unencrypted representation of a portion of the content obtained from the database;
  application programming running on the server, configured to
    a) in response to receipt of a database query containing a wildcard character, conduct a wildcard search of the unencrypted representation of the portion of the content stored in the volatile memory and output a result of the wildcard search,
    b) receive an input from a user in response to the result,
    c) retrieve from the non-secure database discrete encrypted data from the database in non-volatile storage based upon the user input;
    d) decrypt the discrete encrypted data using a key retrieved from a keystore that is accessible by the server but is stored remote from the server, and is inaccessible to both the physically non-secure database and the user; and
    e) provide an unencrypted version of the discrete encrypted data to the user;
  a publish/subscribe mechanism, coupled to both the server and a second server, configured to maintain coherency between the unencrypted representation of the portion of the content in the volatile memory associated with the server and an unencrypted representation of the portion of the content stored in a volatile memory associated with the second server.

10. The computer apparatus of claim 9, wherein the volatile memory comprises a cache memory.

11. The computer apparatus of claim 9, wherein
  the volatile memory associated with the second server is accessible by a processor, the second server being configured for connection to the physically non-secure database to obtain the unencrypted representation of the portion of the content, the computer apparatus further comprising:
  second application programming running on the server, configured to a) in response to receipt of a database query containing a wildcard character, conduct a wildcard search of the representation of the portion stored in the volatile memory of the second server and output a result of the wildcard search,
b) receive an input from a user in response to the result,
c) retrieve from the non-secure database discrete encrypted data from the database based upon the user input;
d) decrypt the discrete encrypted data using the key retrieved from the keystore; and
e) provide an unencrypted version of the discrete encrypted data to the user.

12. The computer apparatus of claim 11 wherein the application programming running on the server is further configured to, in response to an indication from the publish/subscribe mechanism that the representation is stale, retrieve from the non-secure database updated information in encrypted form, decrypt the updated information and update the representation with the unencrypted updated information.

13. The computer apparatus of claim 11 wherein the key store is located remote from, but accessible to the second server and is usable to decrypt encrypted information received by the second server from the remote, physically non-secure database and store a result of the decrypting of the encrypted information in the volatile memory as at least part of the representation of the portion of the content obtained from the database.

14. The computer apparatus of claim 9, wherein the server is a first server, the computer apparatus further comprising:
multiple other servers each having volatile memory containing unencrypted representations of the portion of the content; and
application programming running on each of the multiple other servers configured to perform a) through e).

15. The computer apparatus of claim 14 further comprising:
a publish/subscribe subsystem, coupled to the first server and the multiple other servers, configured to maintain coherency among the unencrypted representations of the portion of the content in each of the volatile memories.

16. The computer apparatus of claim 9, further comprising, an encrypted connection to the server over which the database query is received.

* * * * *